(12) United States Patent
Onoda et al.

(10) Patent No.: US 8,806,874 B2
(45) Date of Patent: Aug. 19, 2014

(54) AXIAL TURBINE AND POWER PLANT

(71) Applicant: Kabushiki Kaisha Toshiba, Tokyo (JP)

(72) Inventors: Akihiro Onoda, Yokohama (JP); Yuki Mimura, Yokohama (JP); Tomohiko Tsukuda, Yokohama (JP); Iwataro Sato, Hiratsuka (JP); Kazutaka Tsuruta, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/783,669

(22) Filed: Mar. 4, 2013

(65) Prior Publication Data

US 2014/0020391 A1   Jan. 23, 2014

(30) Foreign Application Priority Data

Jul. 20, 2012  (JP) ................................. 2012-161734

(51) Int. Cl.
*F02C 7/12* (2006.01)

(52) U.S. Cl.
USPC ............................................ 60/806; 415/115

(58) Field of Classification Search
USPC ............ 60/805, 806; 415/108, 115–117, 191, 415/199.5; 416/96 R, 97 R
See application file for complete search history.

(56) References Cited

U.S. PATENT DOCUMENTS

| | | | | |
|---|---|---|---|---|
| 2,896,906 A | * | 7/1959 | Durkin | 415/115 |
| 3,429,557 A | * | 2/1969 | Brandon et al. | 415/58.7 |
| 4,571,935 A | * | 2/1986 | Rice | 60/775 |
| 5,253,976 A | * | 10/1993 | Cunha | 415/114 |
| 5,397,217 A | * | 3/1995 | DeMarche et al. | 416/97 R |
| 5,755,556 A | * | 5/1998 | Hultgren et al. | 416/96 R |
| 5,795,130 A | * | 8/1998 | Suenaga et al. | 416/95 |
| 6,195,979 B1 | * | 3/2001 | Fukuyama | 60/806 |
| 6,334,756 B1 | * | 1/2002 | Akiyama et al. | 415/116 |
| 7,086,828 B2 | * | 8/2006 | Haje et al. | 415/115 |
| 8,556,576 B2 | * | 10/2013 | Wilson et al. | 415/115 |
| 2002/0150467 A1 | * | 10/2002 | Tanioka | 415/115 |
| 2004/0163394 A1 | * | 8/2004 | Marushima et al. | 60/806 |
| 2011/0171005 A1 | * | 7/2011 | Ito et al. | 415/115 |
| 2014/0020402 A1 | * | 1/2014 | Okamura et al. | 60/784 |

FOREIGN PATENT DOCUMENTS

| | | |
|---|---|---|
| JP | 4525976 | 6/2010 |
| JP | 4540357 | 7/2010 |
| WO | WO 2004/003346 A1 | 1/2004 |

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

An axial-flow turbine has turbine nozzles, a heat shield plate, a first communication hole formed in the turbine rotor and connected to the space, to flow a cooling medium, a first opening formed in at least any one of the two adjacent rotor disks, to be connected to the space, a second communication hole connected to the space through the first opening, to communicate with an implant unit of the turbine rotor blade in the rotor disk, a third communication hole connected to the second communication hole, to communicate along an effective length of the turbine rotor blade, a second opening formed in a side face of the turbine rotor blade, to be connected to the third communication hole, and a third opening formed in an outer circumferential end face of the turbine rotor blade, to be connected to the third communication hole.

12 Claims, 11 Drawing Sheets

FIG. 11

AXIAL TURBINE AND POWER PLANT

CROSS REFERENCE TO RELATED APPLICATIONS

This application is based upon and claims the benefit of priority from the prior Japanese Patent Application No. 2012-161734, filed on Jul. 20, 2012, the entire contents of which are incorporated herein by reference.

FIELD

Embodiments of the present invention relate to an axial-flow turbine and a power plant.

BACKGROUND

In recent years, it has been strongly desired to restrain global warming. Under such a circumstance, power plants have been desired to restrain the generation of $CO_2$, $SO_X$, $NO_X$, etc. by reducing the consumption of fuel for generating power while improving power generation efficiency.

In thermal power plants using steam turbines, gas turbines, etc., the temperature at the inlet of the turbine has been increased, as an effective technique for improving efficiency.

The turbine has stationary parts and rotational parts such as a rotor and rotor blades, and it is essential to provide a gap between the stationary parts and the rotational parts to avoid the contact therebetween.

Therefore, working fluid inevitably leaks through the gap outside the turbine blades, and metal surface is exposed to the temperature of the working fluid. Therefore, when high-temperature working fluid is used, even heat-resistant alloy may be unable to meet required strength characteristics.

Accordingly, a structure for cooling partially according to need has been proposed. For example, there is one conventional structure in which working fluid reduced in temperature by the complete of the work in a turbine stage on the downstream side is partially guided, to the outer surface of the turbine rotor or to the outer circumferential wall of the leading edges of the rotor blades in a stage on the upper stream side to cool the working fluid, and the cooled working fluid is emitted from the ground. It is assumed that this structure can be safely applied to a steam turbine having a main flow temperature of about 600° C. However, when this structure is applied to a gas turbine etc. having a main flow gas temperature of higher than 1000° C., sufficient cooling cannot be achieved since high temperature is kept also in the turbine stages on the downstream side. Further, since working fluid extracted from the middle stage is used for cooling and then emitted from the ground, the emitted working fluid cannot be recovered as power, which inevitably leads to reduction in efficiency.

Further, in Patent Document 2 for example, a space is formed between the outer surface of a pathway contacted with the main flow and the outer surface retaining blades, and an implant unit of the rotor blade has a conduction part. In this structure, space of on the upper stream side of the rotor blades and space on the downstream are communicated, and cooling medium passes therethrough for cooling. In such a communication structure, the temperature of the cooling medium is increased as approaching the downstream side of the cooling space, which clearly leads to reduction in cooling efficiency. When working fluid of the main flow does not have high temperature, there will be no particular problem since the increase in temperature of the cooling medium is not great. However, when high-temperature working fluid is used, it is difficult to achieve sufficient cooling.

As stated above, when working fluid of the main flow has high temperature, it is difficult to obtain sufficient cooling effect by the conventional techniques. Accordingly, cooling has been performed by increasing the amount of cooling medium. However, if the amount of cooling medium to be used is increased, efficiency of the entire plant is reduced, which is an obstruction to increasing temperature to improve power generation efficiency.

DETAILED DESCRIPTION

According to one embodiment, an axial-flow turbine has turbine nozzles arranged to form a line in a circumferential direction of an annular flow channel formed between an outer diaphragm ring and an inner diaphragm ring, the turbine nozzles being arranged corresponding to each of turbine stages arranged along a central rotation axis, turbine rotor blades arranged downstream of the turbine nozzles and implanted, to form a line in the circumferential direction, in each of turbine rotor disks provided along the central rotation axis of a cylindrical flow channel formed by the inner diaphragm ring, the turbine rotor blades being arranged corresponding to each of the turbine stages arranged on the central rotation axis, a heat shield plate provided to form a space between the heat shield plate and an outer surface of the turbine rotor, between two rotor disks adjacent to each other along the central rotation axis, a first communication hole formed in the turbine rotor and connected to the space, to flow a cooling medium, a first opening formed in at least any one of the two adjacent rotor disks, to be connected to the space, a second communication hole connected to the space through the first opening, to communicate with an implant unit of the turbine rotor blade in the rotor disk, a third communication hole connected to the second communication hole, to communicate along an effective length of the turbine rotor blade, a second opening formed in a side face of the turbine rotor blade, to be connected to the third communication hole, and a third opening formed in an outer circumferential end face of the turbine rotor blade, to be connected to the third communication hole.

Hereinafter, an axial-flow turbine according to the embodiments of the present invention will be explained referring to the drawings.

(1) First Embodiment

Figure 1:
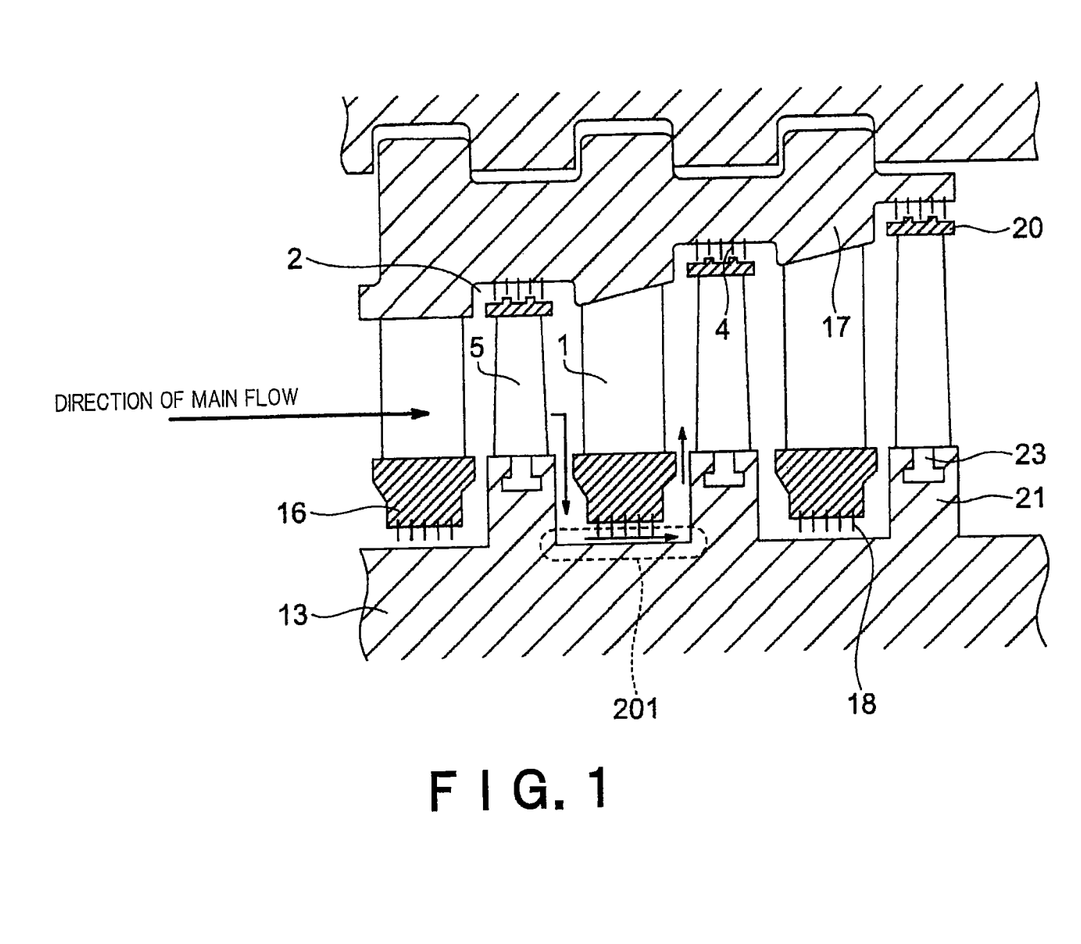
FIG. 1 is a longitudinal sectional view showing a schematic turbine stage structure of an axial-flow turbine according to a first embodiment of the present invention.

FIG. 1 shows a schematic turbine stage structure of an axial-flow turbine according to a first embodiment of the present invention.

A plurality of turbine nozzles 1 are arranged to form a line in the circumferential direction of an annular flow channel formed between an outer diaphragm ring 17 and an inner diaphragm ring 16, and the turbine nozzles 1 are arranged corresponding to each of stages arranged along the central rotation axis. A labyrinth packing 18 is circumferentially fixed between the inner diaphragm ring 16 and a rotor 13 in order to reduce the leakage of a working fluid.

Turbine rotor blades 5 are arranged downstream of the turbine nozzles 1 corresponding to each stage, while facing the turbine nozzles 1. The turbine rotor blades 5 are implanted in each rotor disk 21 having implant units 23 of the turbine rotor blades 5, at predetermined intervals to form a line in the outer circumferential direction of the rotor disk 21. The turbine rotor blades 5 generate output by obtaining rotational energy from the working fluid.

A snubber 20 is provided at the leading edge of the turbine rotor blade 5 to restrain vibration. Between the snubber 20 and the outer diaphragm ring 17, sealing fins 4 are circumferentially fixed to reduce the leakage of the working fluid. Along from left to right in a viewing direction of FIG. 1, first-stage turbine rotor blades, second-stage turbine nozzles, second-stage turbine rotor blades are sequentially arranged along the central rotation axis.

Figure 2:
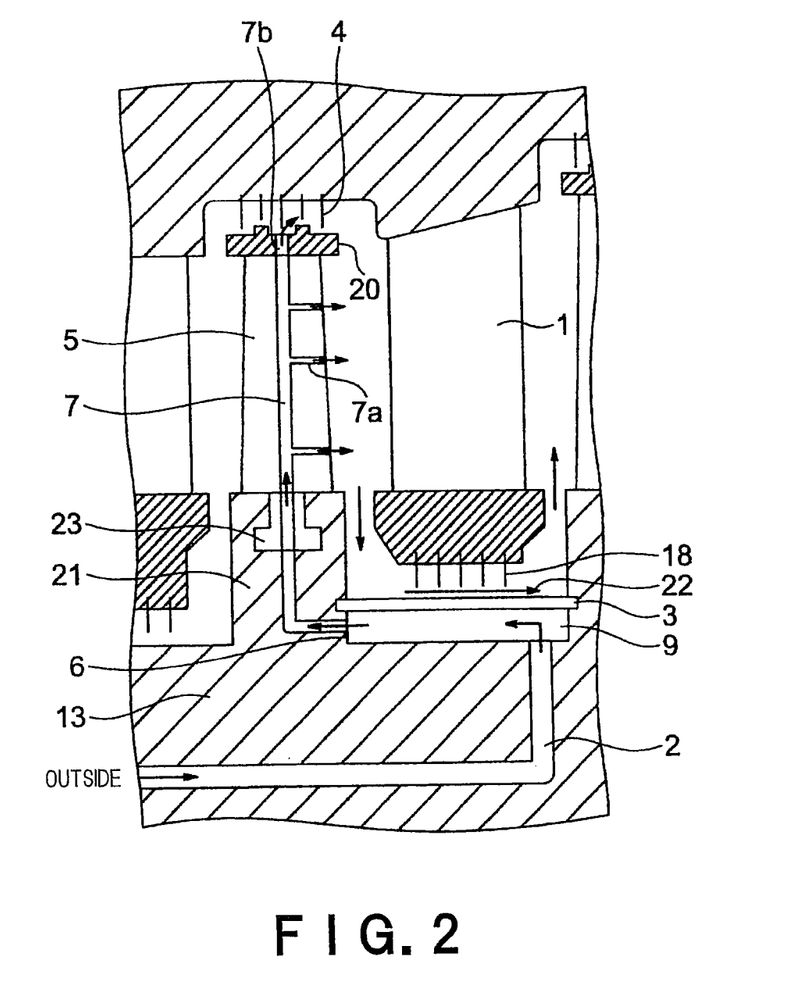
FIG. 2 is a partially enlarged longitudinal sectional view of a turbine stage structure of the axial-flow turbine according to the first embodiment.

FIG. 2 is an enlarged view of a cross sectional view in a radial direction of the first-stage turbine rotor blade 5 and a region 201 enclosed with a dotted line in FIG. 1. The region 201 is a region between the first-stage turbine rotor blade 5 and the second-stage turbine rotor blade 5 and faces the inner diaphragm ring 16 of the second-stage turbine nozzle 1.

In this first embodiment, a heat shield plate 3 is circumferentially provided between the first-stage turbine rotor blades 5 and the second-stage turbine rotor blades 5, to form a space 9 between the heat shield plate 3 and the outer surface of the turbine rotor 13. The heat shield plate 3 isolates a high-temperature leakage fluid 22 leaking from the main flow from the turbine rotor 13, in order not to heat the outer surface of the turbine rotor 13.

The heat shield plate 3 has two ends arranged along the central rotation axis and connected to two rotor disks 21 adjacent to each other along the central rotation axis.

A communication hole 2 is formed in the turbine rotor 13 to supply a cooling medium from the outside. The communication hole 2 is connected to the space 9 formed between the heat shield plate 3 and the outer surface of the turbine rotor 13.

The space 9 is connected to an opening 6 of the rotor disk 21, and further connected to a communication hole 7 formed over the effective length of the turbine rotor blade 5 through the implant unit 23 of the turbine rotor blade 5. The communication hole 7 is connected to openings 7a formed in the side face of the turbine rotor blade 5, or connected to an opening 7b formed in the snubber 20 on the outer circumferential end face of the turbine rotor blade 5.

The cooling medium sequentially passes through the communication hole 2 of the turbine rotor 13, the space 9, the opening 6 of the rotor disk 21, and the communication hole 7 in the turbine rotor blade 5. Finally, the cooling medium flows into the main flow from the communication hole 7 through the openings 7a or through the opening 7b. Therefore, the fluid pressure of the cooling medium should be higher than the fluid pressure of the main flow.

Since the cooling medium supplied from the outside passes through the space 9 between the heat shield plate 3 and the outer surface of the turbine rotor 13, the outer surface of the turbine rotor 13 is cooled and protected. Further, since the cooling medium passes through the communication hole 7 over the effective length of the turbine rotor blade 5 through the implant unit 23 of the turbine rotor blade 5, these parts are also cooled and protected.

By flowing the cooling medium finally increased in temperature into the main flow, the medium can be utilized as a working fluid. Here, the outlet of the communication hole 2 is connected to the space 9 so that the outlet is located on the downstream side of the working fluid, and the cooling medium flows in the opposite direction of the flow of the working fluid. The cooling medium passes through the opening 6, flows into the communication hole 7 of the first-stage turbine rotor blade 5 located in the former stage of the second-stage turbine nozzle 1, and flows into the main flow. Since the cooling medium increased in temperature flows into the main flow from the upstream side of the cooled parts, the medium can work efficiently as a working fluid.

According to this first embodiment, each stage can be cooled by the cooling medium flowed from the outside. Thus, even when the temperature of the working fluid is high, it is possible to sufficiently cool and protect the outer surface of the turbine rotor 13, and particularly the turbine rotor blade 5 over its effective length and the implant unit 23 of the turbine rotor blade 5.

Further, turbine output can be increased by flowing the cooling medium increased in temperature by cooling the turbine rotor blade 5 and the implant unit 23 into the main flow. As a result, the cooling medium used for cooling can be reused for output to restrain the reduction in efficiency.

Although not shown in FIG. 2, the communication hole is not provided in the turbine rotor 13 facing the first-stage turbine nozzle 1, and the space 9 formed by the heat shield plate 3 is also not formed in the position facing the first-stage turbine nozzle 1. The turbine rotor 13 in this region is cooled by a cooling medium supplied from a ground 111 (explained later using FIG. 9) arranged forward, the cooling medium having a higher pressure than the main flow and mixed with the main flow.

For example, in the case of five-stage configuration, the first-stage turbine nozzles 1, the first-stage turbine rotor blades 5, the second-stage turbine nozzles 1, the second-stage turbine rotor blades 5, - - -, the fifth-stage turbine nozzle(s) 1, and the fifth-stage turbine rotor blades 5 are sequentially arranged from the upper stream to the lower stream.

In this first embodiment, excepting the first-stage turbine nozzle 1 and the fifth-stage turbine rotor blade 5, the structure shown in FIG. 2 is applied to each of the following combinations: the first-stage turbine rotor blade 5 and the second-stage turbine nozzle 1; the second-stage turbine rotor blade 5 and the third-stage turbine nozzle(s) 1; - - - the fourth-stage turbine rotor blade 5 and the fifth-stage turbine nozzle 1.

However, the configuration shown in FIG. 2 may be applied at least to the first-stage turbine rotor blade 5 and the second-stage turbine nozzle 1.

(2) Second Embodiment

A configuration of the axial-flow turbine according to a second embodiment of the present invention will be explained using FIG. 3. Note that the same components as those in the first embodiment are given the same symbols, and the explanation thereof will be omitted.

In the above first embodiment, as stated above, the outlet of the communication hole 2 in the turbine rotor 13 is provided on the downstream side of the turbine nozzle 1 between the rotor disks 21 arranged along the central rotation axis. Accordingly, the cooling medium flows into the main flow on the upstream side after cooling the heat shield plate 3, the implant unit 23 of the turbine rotor blade 5 on the upstream side, and the turbine rotor blade 5. This means that the cooling medium makes a larger contribution to the work for rotating and driving the turbine.

On the other hand, in this second embodiment, the communication hole 2 in the turbine rotor 13 is branched.

A communication hole 2a, which is one of the branched holes, is connected directly to the communication hole 7 in the turbine rotor blade 5 through the implant unit 23 of the first-stage turbine rotor blade 5. A communication hole 2b, which is the other of the branched holes, is connected to the space 9 provided between the rotor disks 21.

According to this structure, a cooling medium for cooling the implant unit 23 of the turbine rotor blade 5 and the turbine rotor blade 5 itself, and a cooling medium for cooling the heat shield plate 3 can be supplied through the communication hole 2.

Further, in this second embodiment, the outlet of the communication hole 2b, which is the other branched from the communication hole 2, is connected to the upstream side of the space 9 between the rotor disks 21 arranged along the central rotation axis. The cooling medium flows into the space 9, flows through the space 9 in the same direction as the main flow, and guided to a through-hole 2a provided in the rotor disk 21 implanted with the second-stage turbine rotor blade 5, through the opening 6 provided on the downstream side.

Figure 3:
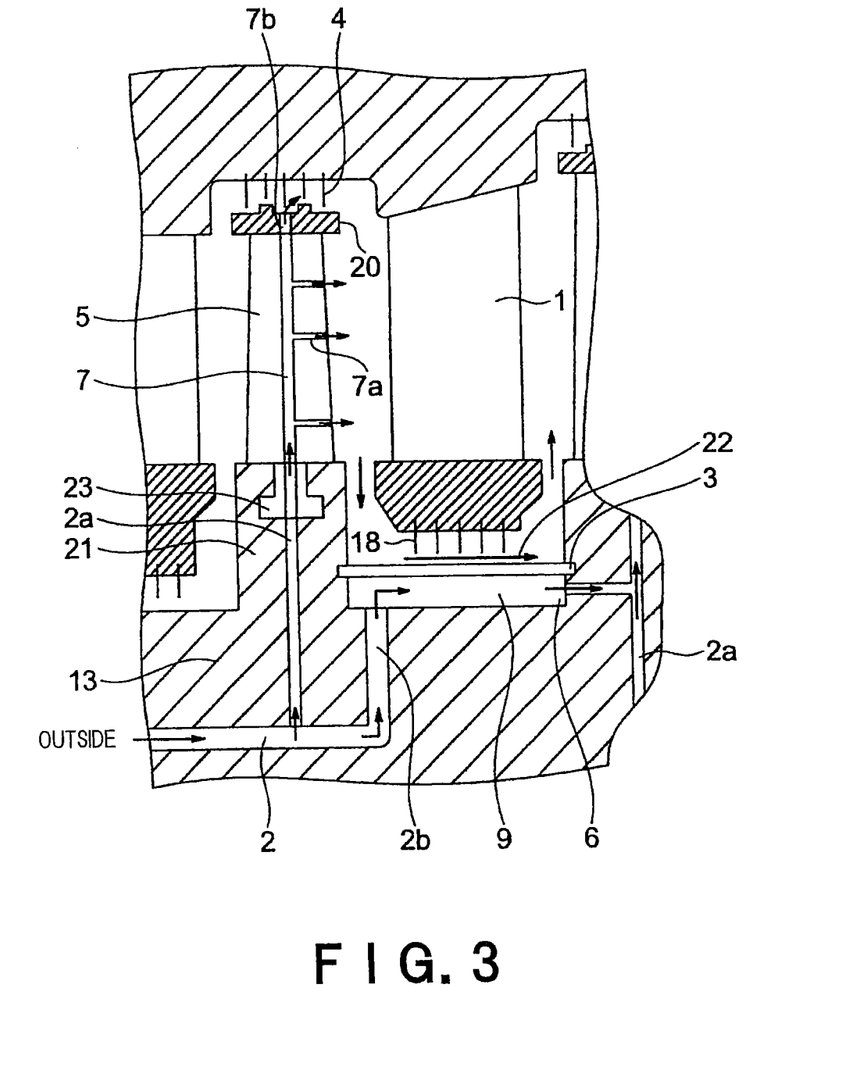
FIG. 3 is a partially enlarged longitudinal sectional view of a turbine stage structure of the axial-flow turbine according to a second embodiment of the present invention.

Similarly to the rotor disk 21 implanted with the first-stage turbine rotor blade 5 as shown in FIG. 3, the rotor disk 21 implanted with the second-stage turbine rotor blade 5 has one communication hole 2a branched from another communication hole 2 in the turbine rotor 13, and the cooling medium supplied from the another communication hole 2 and the cooling medium flowing from the space 9 through the opening 6 join together. The communication hole 2a is connected to the communication hole 7 along the effective length of the second-stage turbine rotor blade 5 through the implant unit 23.

Similarly, in the subsequent stage, one communication hole 2a branched from the communication hole 2 in the turbine rotor 13 is connected to the communication hole 7 in the third-stage turbine rotor blade 5, and the other branched communication hole 2b is connected to the space 9 provided between the rotor disk 21 of the third-stage turbine rotor blade 5 and the rotor disk 21 of the fourth-stage turbine rotor blade 5.

Further, in this second embodiment, similarly to the above first embodiment, the turbine rotor 13 facing the first-stage turbine nozzle 1 is cooled by the cooling medium supplied from the ground 111 arranged forward.

In this second embodiment, similarly to the above first embodiment, the outer surface of the turbine rotor 13 is cooled and protected by passing the cooling medium through the space 9 between the heat shield plate 3 and the outer surface of the turbine rotor 13, and the turbine rotor blade 5 is cooled and protected by passing the cooling medium through the implant unit 23 of the turbine rotor blade 5 and through the communication hole 7 along the effective length of the turbine rotor blade 5. Further, by flowing the cooling medium increased in temperature into the main flow to utilize it as a working fluid, the cooling medium used for cooling can be reused to restrain the reduction in efficiency.

Further in this second embodiment, since the cooling medium supplied to the through-hole 2 in the turbine rotor 13 is flowed to the two branched through-holes 2a and 2b, the cooling medium passes through the implant unit 23 of each of the two adjacent turbine rotor blades 5 and through the communication hole 7 along the effective length of the turbine rotor blade 5, which makes it possible to cool and protect the turbine rotor blades 5 efficiently.

(3) Third Embodiment

Figure 4:
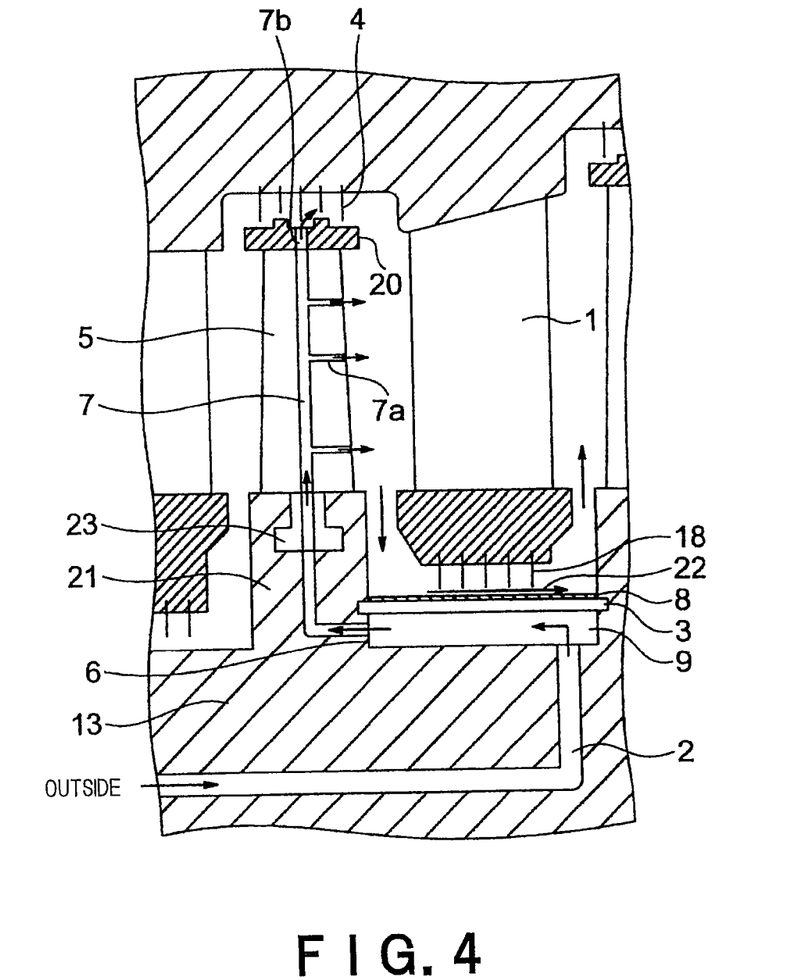
FIG. 4 is a partially enlarged longitudinal sectional view of a turbine stage structure of the axial-flow turbine according to a third embodiment of the present invention.

A configuration of the axial-flow turbine according to a third embodiment of the present invention will be explained using FIG. 4. Note that the same components as those in the first and second embodiments are given the same symbols, and the explanation thereof will be omitted.

In this third embodiment, a heat insulating layer 8 having a lower thermal conductivity than the heat shield plate 3 is arranged on the outer circumferential surface of the heat shield plate 3 provided on the outer surface of the turbine rotor 13 between the rotor disks 23 implanted with the two adjacent turbine rotor blades 5.

The heat insulating layer 8 can be made by using various materials used for thermal barrier coating (high temperature corrosion resistant coating), such as M (nickel, cobalt, iron, or any combination of these materials), Cr (chromium), Al (aluminum), Y (yttrium), and a combination of MCrAlY and a ceramic material.

In this way, the high-temperature leakage fluid 22 is thermally insulated from the heat shield plate 3, and thus the amount of the cooling medium flowed from the outside can be further reduced. As a result, the outer surface of the turbine rotor 13 can be cooled and protected with a smaller amount of cooling medium, which improves turbine efficiency.

(4) Fourth Embodiment

Figure 5:
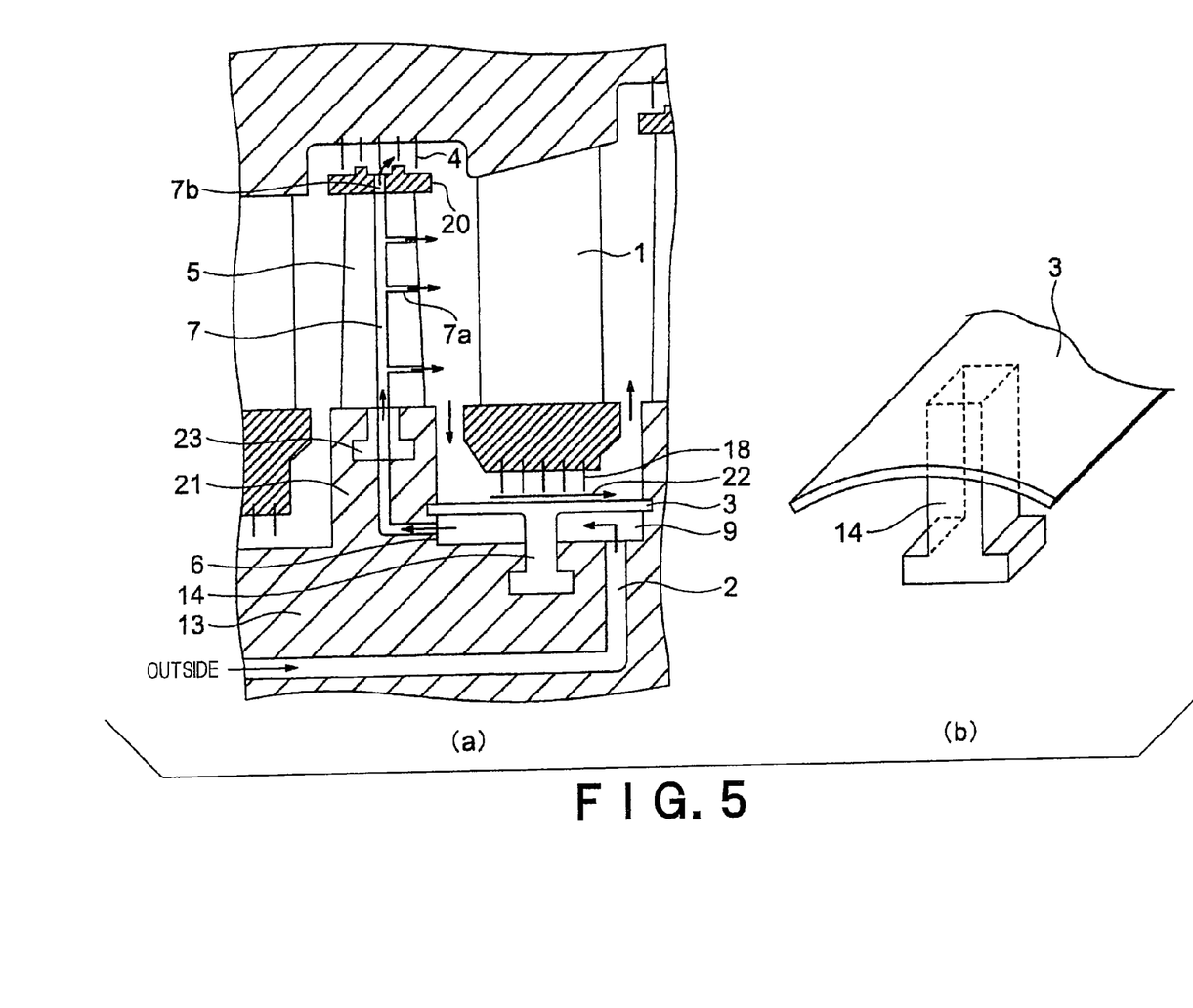
FIG. 5 is a partially enlarged longitudinal sectional view of a turbine stage structure of the axial-flow turbine according to a fourth embodiment of the present invention.

A configuration of the axial-flow turbine according to a fourth embodiment of the present invention will be explained using FIG. 5. Note that the same components as those in the first to third embodiments are given the same symbols, and the explanation thereof will be omitted.

This fourth embodiment is characterized in that a leg structure 14 for supporting the heat shield plate 3 is arranged on the inner circumferential side of the heat shield plate 3 covering the outer surface of the turbine rotor 13 between the rotor disks 21 implanted with the first-stage and second-stage turbine rotor blades 5 adjacent to each other, and in that the inner circumferential part of the leg structure 14 has a shape similar to the implant unit 23, in order to be fixed to the turbine rotor 13. In this fourth embodiment, the leg structure 14 has a shape similar to the implant unit 23 as an example of the shape realizing the fixation to the turbine rotor 13, but the shape is not limited to this, and another shape may be employed as long as fixation can be achieved by the shape.

The cooling medium sequentially passes through the communication hole 2 of the turbine rotor 13, the space 9, the opening 6 of the rotor disk 21, and the communication hole 7 in the turbine rotor blade 5. Finally, the cooling medium flows into the main flow from the communication, hole 7 through the openings 7a formed in the side face of the turbine rotor blade 5, or through the opening 7b formed in the snubber 20 on the outer circumferential end face of the turbine rotor blade 5.

The heat shield plate 3 is applied with stress in the outer circumferential direction due to the pressure difference between the leakage fluid 22 and the cooling medium. Further, the heat shield plate 3 connected between the rotor disks 21 rotates with the turbine rotor 13. Thus, the heat shield plate 3 may possibly be deformed in the outer circumferential direction due to the centrifugal force applied to the heat shield plate 3. A gap should be secured between the heat shield plate 3 and the labyrinth packing 18 to prevent the contact therebetween. However, when the gap is large, the amount of the leakage fluid 22 is increased and turbine efficiency is reduced.

Accordingly, by providing the leg structure 14 on the inner circumferential side of the heat shield plate 3, it is possible to prevent the heat shield plate 3 from deformation due to the pressure difference between the leakage fluid 22 and the cooling medium, and due to the centrifugal force. Further, by preventing the deformation of the heat shield plate 3, the gap between the heat shield plate 3 and the labyrinth packing 18 can be secured at an appropriate value, which makes it possible to restrain the reduction in turbine efficiency.

(5) Fifth Embodiment

Figure 6:
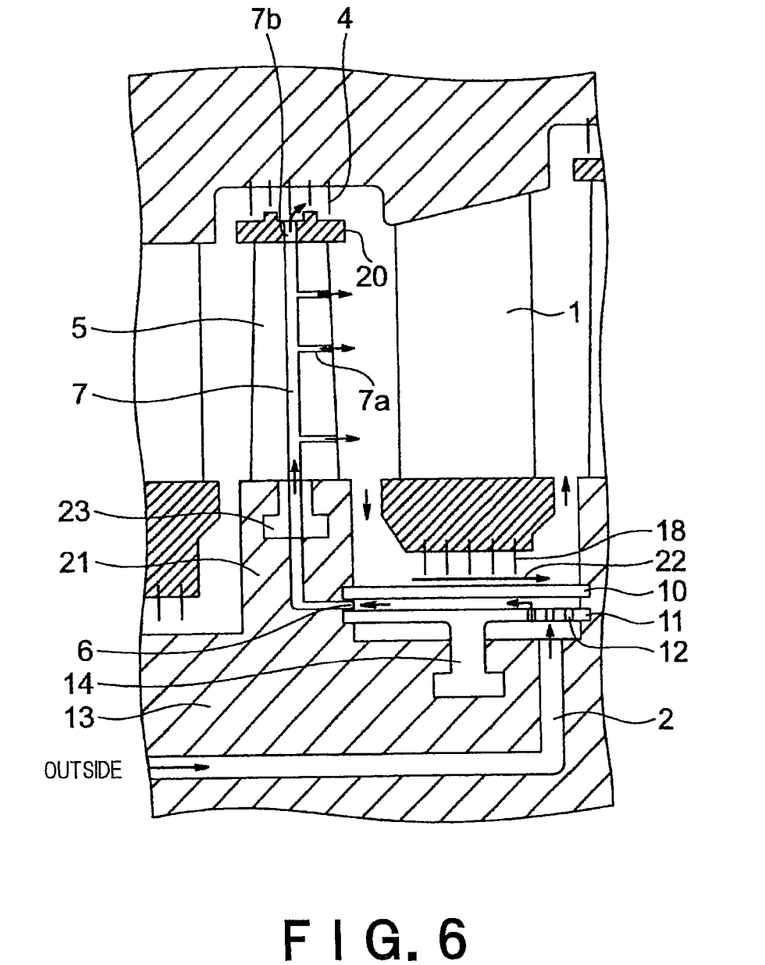
FIG. 6 is a partially enlarged longitudinal sectional view of a turbine stage structure of the axial-flow turbine according to a fifth embodiment of the present invention.

A configuration of the axial-flow turbine according to a fifth embodiment of the present invention will be explained using FIG. 6. Note that the same components as those in the first to fourth embodiments are given the same symbols, and the explanation thereof will be omitted.

In this fifth embodiment, the heat shield plate 3 has a dual structure including a heat shield plate 11 on the inner circumferential side and a heat shield plate 10 on the outer circumferential side arranged to face each other while holding a space in the radial direction. At least any one of the heat shield plates 11 and 10 has two ends connected to the rotor disks 21.

Openings 12 are formed in the heat shield plate 11 on the inner circumferential side, and connected to the opening 6 of the rotor disk 21 through a pathway formed in the space between the heat shield plates 11 and 10.

The cooling medium after passing through the communication hole 2 of the turbine rotor 13 passes through the openings 12 of the heat shield plate 11 on the inner circumferential side, and flows into the space formed between the heat shield plate 11 on the inner circumferential side and the heat shield plate 10 on the outer circumferential side. The cooling medium flowing into this space passes therethrough at a predetermined flow velocity, and passes through the communication hole 7 of the turbine rotor blade 5 through the opening 6 of the rotor disk 21, and finally flows into the main flow. The flow velocity of the cooling medium when passing through the narrow space between the heat shield plates 11 and 10 can be arbitrarily set by a designer based on the temperature and space width of the outer surface of the heat shield plate 11. By increasing this flow velocity, efficient cooling can be achieved through convection cooling. That is, efficient cooling can be achieved using a smaller amount of cooling medium.

In this fifth embodiment, the heat shield plates 11 and 10 make a dual structure, but the number of heat shield plates 11 and 10 should not be limited and a triplex structure etc. can be arbitrarily set.

Further, for example, the two heat shield plates 11 and 10 may be arranged so that one end of the heat shield plate 11 on the inner circumferential side may be connected to the rotor disk 21 like a cantilever, and that both ends of the heat shield plate 10 on the outer circumferential side are connected to the rotor disks 21. In this case, the cooling medium passes through the gap between the rotor disk 21 and the other end of the heat shield plate 11 not connected to the rotor disk 21, and flows into the space between the heat shield plates 11 and 10. In case, the openings 12 of the heat shield plate 11 may be omitted.

(6) Sixth Embodiment

A configuration of the axial-flow turbine according to a sixth embodiment of the present invention will be explained using FIG. 7. Note that the same components as those in the first to fifth embodiments are given the same symbols, and the explanation thereof will be omitted.

In this sixth embodiment, the heat shield plate has a dual structure consisting of the heat shield plate 11 on the inner circumferential side and the heat shield plate 10 on the outer circumferential side, and at least one structure 19 is provided between the heat shield plates 11 and 10. Further, the cooling medium passing through the space between the heat shield plates 11 and 10 passes through the opening 12 of the heat shield plate 11 on the inner circumferential side as directed by an arrow 22c.

As stated in the above fifth embodiment, since the heat shield plates 11 and 10 make a dual structure, the heat shield plates 11 and 10 may possibly be deformed in the outer circumferential direction by centrifugal force in addition to the stress applied in the outer circumferential direction due to the pressure difference between the leakage fluid 22 and the cooling medium. In order to prevent the heat shield plates 11 and 10 from such a deformation, the structures 19 are fixed to connect the heat shield plates 11 and 10.

Further, by fixing a plurality of structures 19 in the space between the heat shield plates 11 and 10, the structures 19 cause turbulence in the flow of the cooling medium passing through this space. Accordingly, convection heat transfer in the space is accelerated, and particularly cooling of the heat shield plate 10 on the outer circumferential side is further accelerated.

Figure 7:
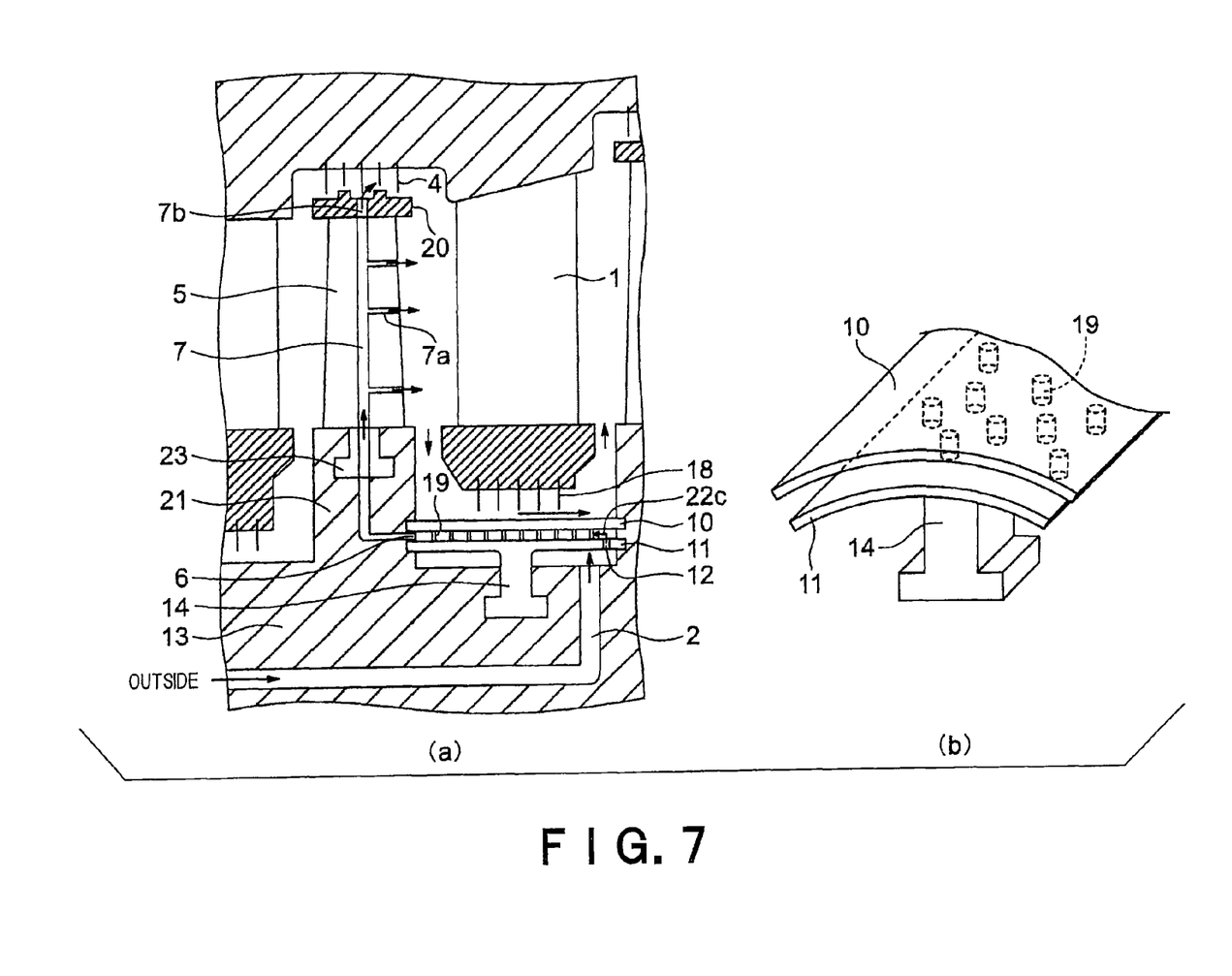
FIG. 7 is a partially enlarged longitudinal sectional view of a turbine stage structure of the axial-flow turbine according to a sixth embodiment of the present invention.

Note that, the shape of the structure 19 provided between the heat shield plates 11 and 10 is not limited to a columnar shape shown in FIG. 7, and it may be an arbitrary shape such as prismatic column, cone, etc.

As stated in the above fifth embodiment, the dual structure consisting of the heat shield plates 11 and 10 is not essential, and an arbitrary number of shield plates can be set to realize a triplex structure etc. In this case, the structures should be fixed at least between two heat shield plates 11 and 10 facing each other. Instead, an all-in-one structure 19 having a plurality of flow channels formed therein may be provided in the space between two heat shield plates 11 and 10 facing each other.

(7) Seventh Embodiment

A configuration of the axial-flow turbine according to a seventh embodiment of the present invention will be explained using FIGS. 8(a) and (b). Note that the same components as those in the first to sixth embodiments are given the same symbols, and the explanation thereof will be omitted.

Figure 8:
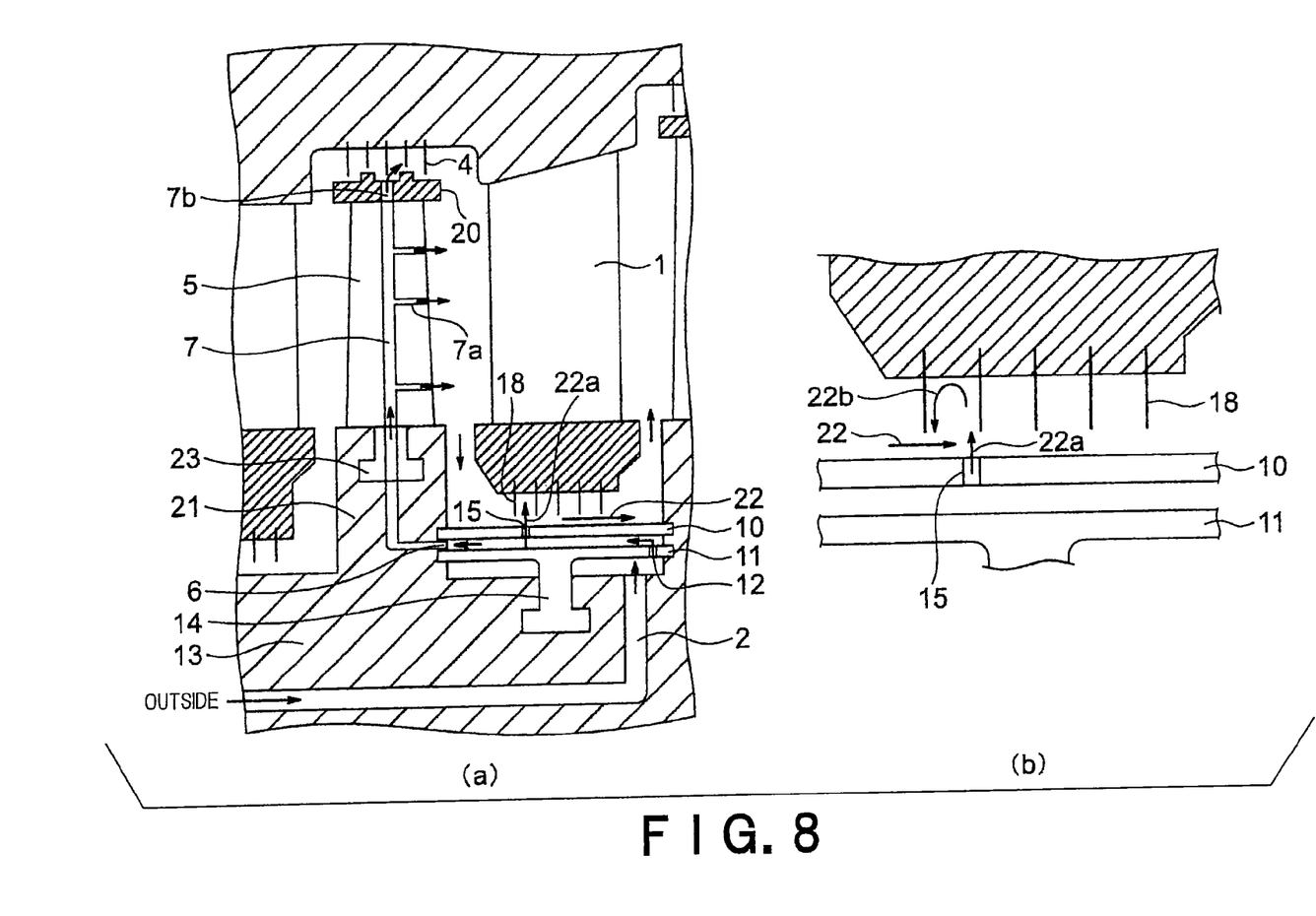
FIG. 8 is a partially enlarged longitudinal sectional view of a turbine stage structure of the axial-flow turbine according to a seventh embodiment of the present invention.

In this seventh embodiment, as shown in FIG. 8(a), the heat shield plate has a dual structure consisting of the heat shield plate 11 on the inner circumferential side and the heat shield plate 10 on the outer circumferential side. The opening 12 is formed in the heat shield plate 11 on the inner circumferential side, and an opening 15 is formed in the heat shield plate 10 on the outer circumferential side. In FIG. 8(a), each of the openings 12 and 15 is formed only in one place. However, a plurality of openings 12 and 15 may be formed in the outer circumferential direction, may be formed along the central rotation axis, or may be formed in the outer circumferential direction and along the central rotation axis.

Further, each of the openings 12 and 15 may have a shape in parallel to the radial direction as shown in FIG. 8(a), or may have a shape slantingly opened in the radial direction.

In this seventh embodiment, a part of the cooling medium passing through the openings 12 of the heat shield plate 11 on the inner circumferential side and through the space between the heat shield plates 11 and 10 is passed through the opening 15 of the heat shield plate 10 on the outer circumferential side so as to be blown out to the leakage fluid 22 as directed by an arrow 22a. Thus, the cooling medium obstructs the flow of the leakage fluid 22 as shown by an arrow 22b in FIG. 8(b), and leakage flow volume can be reduced.

Further, since the high-temperature leakage fluid 22 and the cooling medium are mixed, the temperature of the leakage fluid 22 is reduced and the temperature of the heat shield plate 10 on the outer circumferential side is also reduced, which realizes sufficient cooling. Such a cooling effect is further improved when the opening 15 is formed in the outer circumferential surface of the heat shield plate 10 on the outer circumferential side so that the opening 15 is located upstream of the leakage fluid 22.

Figure 9:
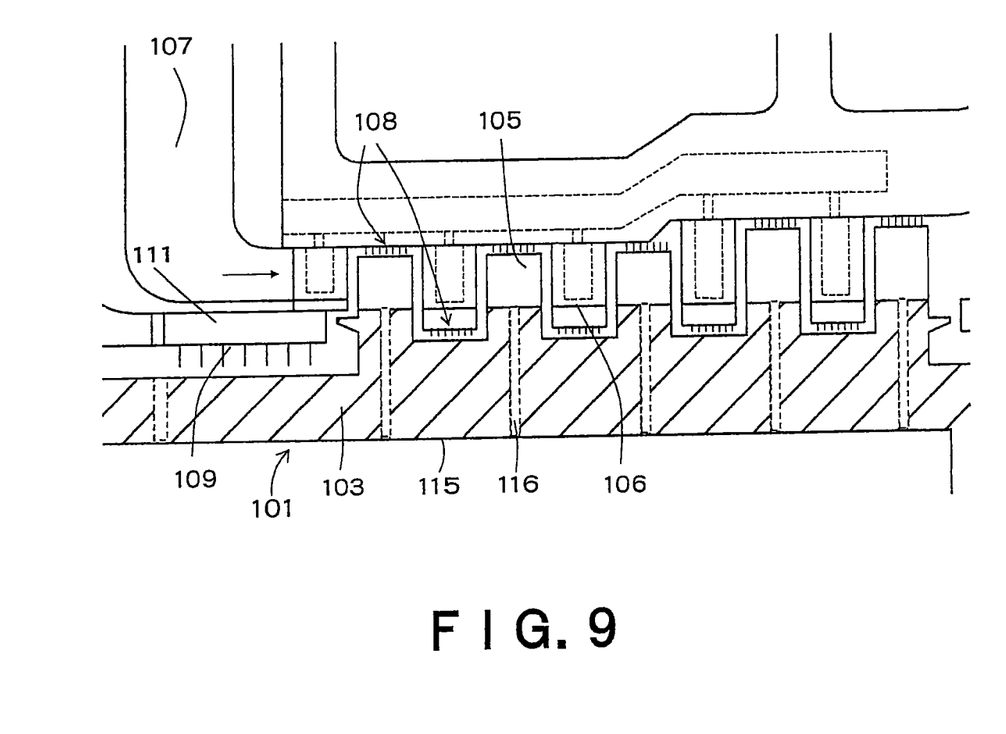
FIG. 9 is a longitudinal sectional view of main components of a $CO_2$ turbine using $CO_2$ as a working fluid.

Next, FIG. 9 shows a cross sectional view along the central rotation axis of main components of a $CO_2$ turbine 101 using $CO_2$ as a working fluid. The axial-flow turbine of the above first to seventh embodiments can be applied to this $CO_2$ turbine 101.

Turbine rotor blades 105 are annularly arranged at regular intervals to form a line in the outer radial direction of a turbine rotor 103. These turbine rotor blades 105 are arranged at predetermined intervals also along the central rotation axis, corresponding to the respective stages. Each of turbine nozzles 106 is arranged between the turbine rotor blades 105 adjacent to each other along the central rotation axis. The turbine nozzles 106 are annularly arranged at regular intervals, corresponding to each stage. The implant unit of each turbine rotor blade 105 is implanted in the outer circumferential surface of the turbine rotor 103.

FIG. 9 shows an example of a five stage configuration alternately arranging five turbine rotor blades 105 and five turbine nozzles 106 along the central rotation axis. However, the number of stages of the turbine rotor blades 105 and turbine nozzles 106 should not be restricted.

The $CO_2$ turbine 101 shown in FIG. 9 drives the turbine rotor 103 using supercritical $CO_2$ as a fluid, and cools each component by circulating $CO_2$ exhausted from the $CO_2$ turbine 101 and injecting it into the $CO_2$ turbine 101.

The critical point of $CO_2$ is 31° C. and 7.4 MPa, and the $CO_2$ turbine 101 shown in FIG. 9 is premised on using $CO_2$ at higher temperature and higher pressure than this critical point.

A sleeve pipe 107 is provided upstream of the $CO_2$ turbine 101 shown in FIG. 9, and supercritical $CO_2$ gas is injected from the sleeve pipe 107 into the turbine, as a fluid. The injected $CO_2$ gas flows from upstream to downstream along the central rotation axis, and exhausted from an exhaust pipe (not shown).

The turbine rotor 103 is rotated and driven utilizing the force generated when the fluid collides with the turbine rotor blades 105, and the fluid leaks through a gap on the outer circumferential side of the turbine rotor blades 105 and through the gap on the inner circumferential side of the turbine nozzles 106. In order to restrain this leakage, sealing structures 108 are arranged on the outer circumferential surface of the turbine rotor blades 105, and on the inner circumferential surface of the turbine nozzles 106, respectively.

The sealing structure 108 consists of sealing fins 109 arranged at predetermined intervals on the outer circumferential surface of the turbine rotor blades 105, and on the inner circumferential surface of the turbine nozzles 106. The sealing structure 108 narrows a gap to prevent the leakage of the fluid.

The sealing structure 108 is provided not only on the outer circumferential surface of the turbine rotor blades 105 and on the inner circumferential surface of the turbine nozzles 106, but also on the ground 111 arranged on the upper side of the turbine nozzles 106 in the uppermost stage.

Even when the sealing structure 108 is provided, high-temperature fluid flows on the outer circumferential surface of the turbine rotor blades 105 and on the inner circumferential surface of the turbine nozzles 106, and thus the turbine rotor blades 105 and the turbine nozzles 106 are exposed to high temperature. Accordingly, in the $CO_2$ turbine 101 shown in FIG. 9, the turbine rotor blades 105 and the turbine nozzles 106 may be cooled using low-temperature $CO_2$ gas (hereinafter referred to as cooling $CO_2$ gas) supplied from the outside.

The turbine rotor 103 used in the $CO_2$ turbine 101 shown in FIG. 9 is partially hollow, and solid at its both ends. More concretely, the turbine rotor 103 is hollow in a region 115 facing the turbine rotor blades 105 and turbine nozzles 106 alternately arranged, and this hollow region 115 has a plurality of fluid paths 116 arranged at predetermined intervals in the outer radial direction of this hollow region 115.

Such a $CO_2$ turbine 101 can be incorporated into a thermal power generating system capable of generating power white separating and recovering $CO_2$.

Figure 10:
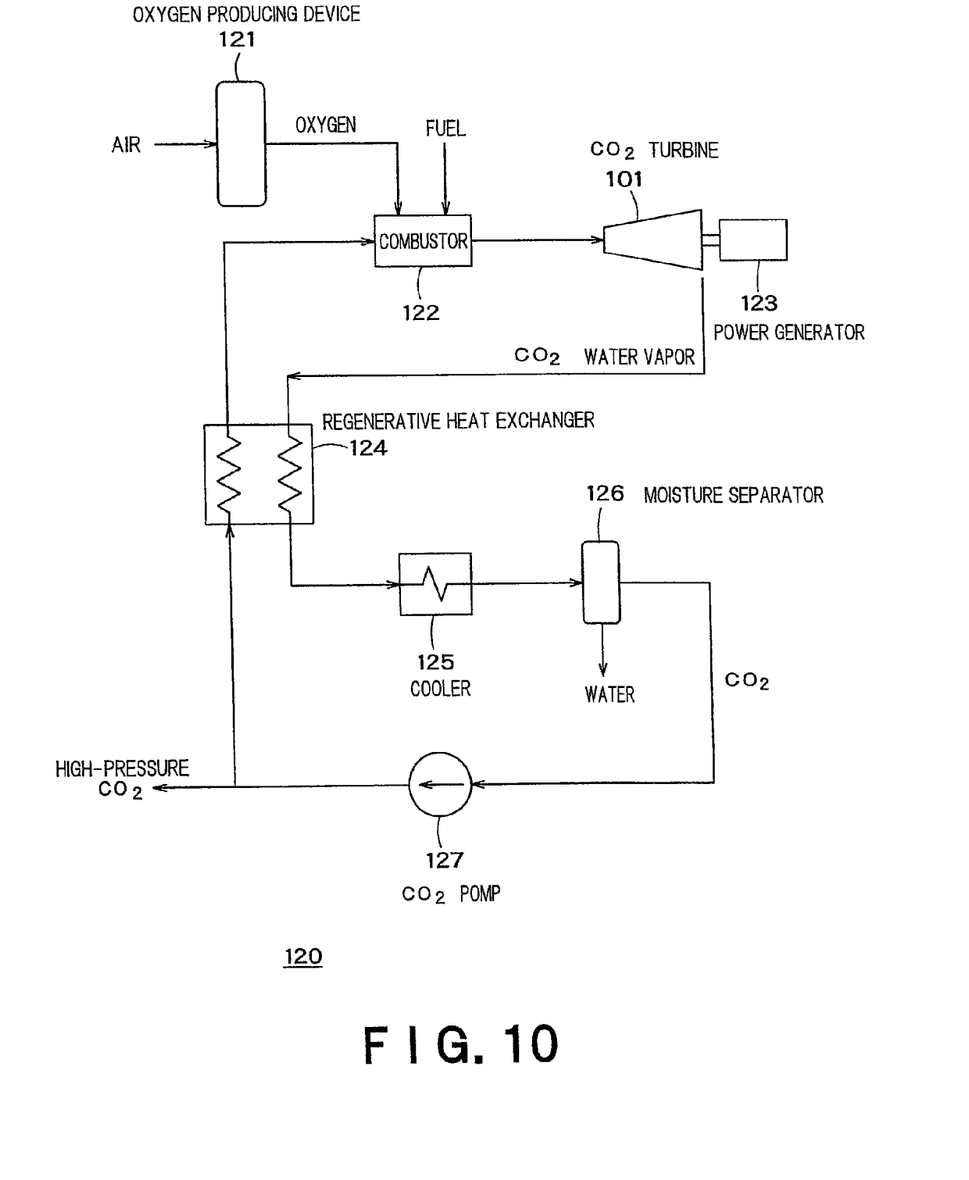
FIG. 10 is a schematic system diagram of a thermal power plant using $CO_2$ as a working fluid, the thermal power plant capable of applying the axial-flow turbine according to the first to seventh embodiments.

FIG. 10 shows a schematic structure of a thermal power plant utilizing the $CO_2$ turbine 101 shown in FIG. 9, as an example. A thermal power plant 120 shown in FIG. 10 has an oxygen producing device 121, a combustor 122, the $CO_2$ turbine 101 shown in FIG. 9, a power generator 123, a regenerative heat exchanger 124, a cooler 125, a moisture separator 126, and a $CO_2$ pump 127.

The oxygen producing device 121 extracts only oxygen by removing nitrogen contained in air. The combustor 122 generates high-temperature combustion gas using the oxygen extracted by the oxygen producing device 121, fuel, and $CO_2$. This combustion gas is composed of $CO_2$ and water. The fuel used by the combustor 122 is non-nitrogenous natural gas, such as methane gas.

The high-temperature and high-pressure $CO_2$ gas generated by the combustor 122 is injected into the $CO_2$ turbine 101 shown in FIG. 9, and used to rotate and drive the turbine rotor 103. The central rotating shaft of the turbine rotor 103 is connected to the power generator 123, and the power generator 123 generates power utilizing the rotational driving force of the turbine rotor 103.

$CO_2$ and water vapor emitted from the $CO_2$ turbine 101 are cooled by the regenerative heat exchanger 124, and then further cooled by the cooler 125. After that, water is removed by the moisture separator 126, and only $CO_2$ is extracted. This $CO_2$ is compressed and pressurized by the $CO_2$ pump 127.

A part of the $CO_2$ pressurized by the $CO_2$ pump 127 is heated by the regenerative heat exchanger 124.

$CO_2$ emitted from the regenerative heat exchanger 124 is used as cooling $CO_2$ for cooling the $CO_2$ turbine 101, and also supplied to the combustor 122.

In the high-pressure $CO_2$ pressurized by the $CO_2$ pump 127, surplus $CO_2$ which is not reused to generate power through the regenerative heat exchanger 124 is recovered to be stored or utilized for another purpose (e.g., to increase the amount of oil drilling).

In this way, the power plant shown in FIG. 10 generates power using only $CO_2$ and water generated through combustion, and most of $CO_2$ is circulated and reused. Accordingly, NOx, which is a harmful gas, is not emitted, and there is no need to additionally provide a facility for separating and recovering $CO_2$. Further, surplus $CO_2$ recovered keeping its high purity can be easily used not only for power generation but also for various other purposes.

Further, the $CO_2$ turbine 101 operates by the high-temperature and high-pressure $CO_2$ gas generated by the combustor 122. Accordingly, the rotor of the $CO_2$ turbine 101 must be cooled. Since the axial-flow turbine according to the above first to sixth embodiments can achieve efficient cooling, the reduction in plant efficiency can be restrained by using the axial-flow turbine as the $CO_2$ turbine 101.

Figure 11:
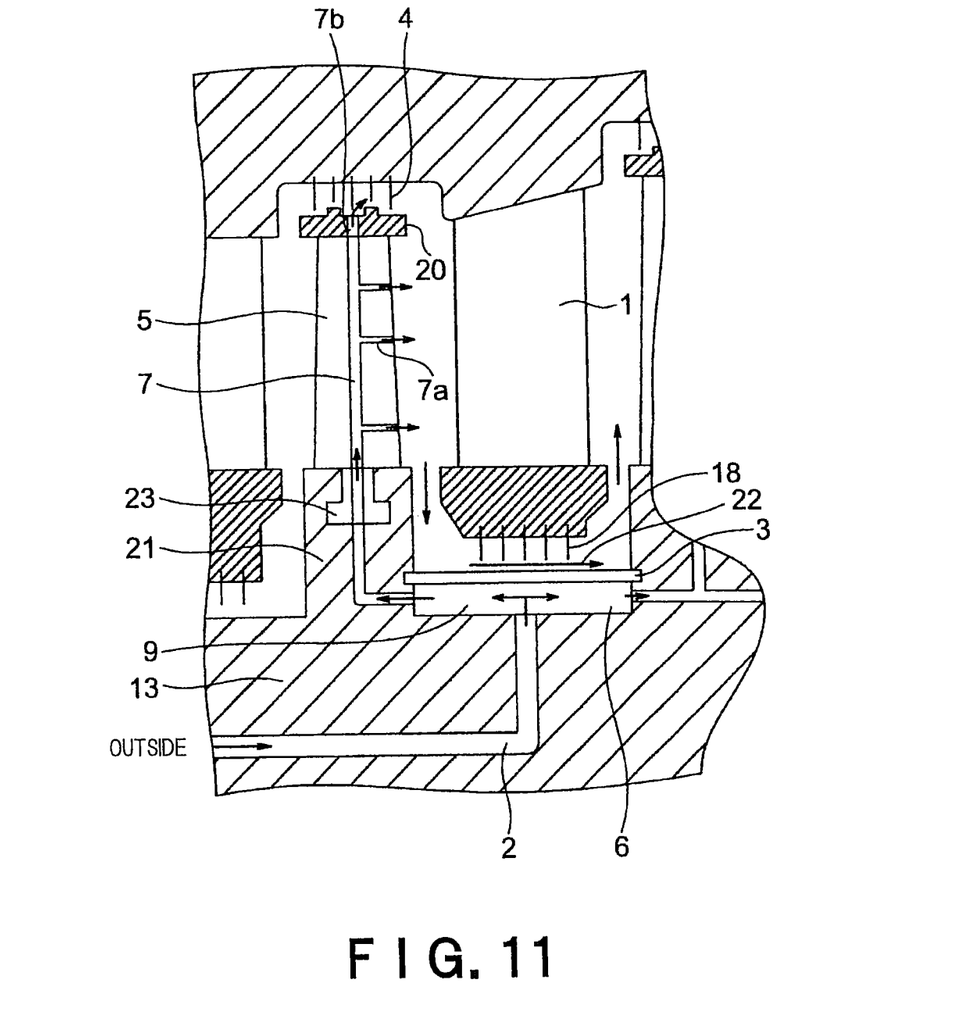
FIG. 11 is a partially enlarged longitudinal sectional view of a turbine stage structure the axial-flow turbine according to a modification example derived from the first and second embodiments.

Some embodiments of the present invention are explained above to show only examples, and are not intended to limit the technical scope of the invention. FIG. 11 shows a configuration of the axial-flow turbine according to a modification example derived from the above first and second embodiments.

In the above first embodiment, as shown in FIG. 2, the outlet of the communication hole 2 in the turbine rotor 13 is connected to the downstream side of the space 9 between the rotor disks 21 ranged along the central rotation axis. Accordingly, the cooling medium flows in the opposite direction of the flow of the working fluid. The cooling medium passes through the opening 6, flows into the communication hole 7 of the first-stage turbine rotor blade 5 located in the former stage of the second-stage turbine nozzle 1, and flows into the main flow.

Further, in the above second embodiment, as shown in FIG. 3, the outlet of the communication hole 2 in the turbine rotor 13 is connected to the upstream side of the space 9 between the rotor disks 21 ranged along the central rotation axis. Accordingly, the cooling medium flows in the same direction as the flow of the working fluid, to pass through the opening 6 on the downstream side, flow through the communication hole 7 of the second-stage turbine rotor blade 5 located downstream of the second-stage turbine nozzle 1, and to flow into the main flow.

On the other hand, this modification example is a combination of the above first and second embodiments. Specifically, as shown in FIG. 11, the outlet of the communication hole 2 in the turbine rotor 13 is connected to the middle part of the space 9 between the rotor disks 21 ranged along the central rotation axis. Accordingly, the cooling medium flows in the same direction as the flow of the working fluid and in the opposite direction of the flow of the working fluid. Then, the cooling medium passes through the opening 6 on the left of the drawing, flows through the communication hole 7 of the first-stage turbine rotor blade 5 located upstream of the second-stage turbine nozzle 1, and flows into the main flow. Simultaneously, the cooling medium passes through the opening 6 on the right of the drawing, flows through the communication hole 7 of the second-stage turbine rotor blade 5 located downstream of the second-stage turbine nozzle 1, and flows into the main flow. By employing such a structure, in this modification example, two turbine rotor blades 5 can be cooled by the cooling medium supplied to one communication hole 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An axial-flow turbine comprising:
   turbine nozzles arranged to form a line in a circumferential direction of an annular flow channel formed between an outer diaphragm ring and an inner diaphragm ring, the turbine nozzles being arranged corresponding to each of turbine stages arranged along a central rotation axis;
   turbine rotor blades arranged downstream of the turbine nozzles and implanted, to form a line in the circumferential direction, in each of turbine rotor disks provided along the central rotation axis of a cylindrical flow channel formed by the inner diaphragm ring, the turbine rotor blades being arranged corresponding to each of the turbine stages arranged on the central rotation axis;
   a heat shield plate provided to form a space between the heat shield plate and an outer surface of the turbine rotor, between two rotor disks adjacent to each other along the central rotation axis;
   a first communication hole formed in the turbine rotor and connected to the space, to flow a cooling medium;
   a first opening formed in at least any one of the two adjacent rotor disks, to be connected to the space;
   a second communication hole connected to the space through the first opening, to communicate with an implant unit of the turbine rotor blade in the rotor disk;
   a third communication hole connected to the second communication hole, to communicate along an effective length of the turbine rotor blade;
   a second opening formed in a side face of the turbine rotor blade, to be connected to the third communication hole; and
   a third opening formed in an outer circumferential end face of the turbine rotor blade, to be connected to the third communication hole.

2. The axial-flow turbine of claim 1,
   wherein the heat shield plate has two ends arranged along the central rotation axis and connected to the two rotor disks adjacent to each other along the central rotation axis.

3. The axial-flow turbine of claim 1,
   wherein the first communication hole has an outlet to the space, the outlet being located downstream of the center between the rotor disks adjacent to each other along the central rotation axis, and
   the first opening is formed in one of the two adjacent rotor disks which is located upstream of the other, and the first opening is located upstream of the outlet of the first communication hole.

4. The axial-flow turbine of claim 1,
   wherein the heat shield plate is provided so that the space is formed between the two adjacent rotor disks on the outer surface of the turbine rotor, the two adjacent rotor disks sandwiching the turbine nozzle of a second stage, and
   the third communication hole is formed at least in the turbine rotor blade of a first stage.

5. The axial-flow turbine of claim 1, further comprising:
   a fourth communication hole formed in the turbine rotor to directly connect the first communication hole and the second communication hole,
   wherein the first communication hole has an outlet to the space, the outlet being located upstream of the center between the rotor disks adjacent to each other along the central rotation axis, and the first opening is formed in one of the two adjacent rotor disks which is located downstream of another, and the first opening is connected to the second communication hole communicating with the implant unit of the turbine rotor blade formed in this rotor disk.

6. The axial-flow turbine of claim 1,
wherein the first communication hole has an outlet to the space, the outlet being located around the center of the center between the rotor disks adjacent to each other along the central rotation axis, and
the first opening is formed in each of the two adjacent rotor disks, and is connected to the second communication hole communicating with the implant unit of the turbine rotor blade formed in each of these two rotor disks.

7. The axial-flow turbine of claim 1, further comprising:
a heat insulating layer provided on an outer circumferential surface of the heat shield plate, the heat insulating layer having lower thermal conductivity than the heat shield plate.

8. The axial-flow turbine of claim 1, further comprising:
a leg structure configured to fix the heat shield plate to the turbine rotor.

9. The axial-flow turbine of claim 1,
wherein the heat shield plate has a dual structure comprising a first heat shield plate on the outer circumferential side and a second heat shield plate on the inner circumferential side, the heat shield plate being arranged to face each other sandwiching a space in a radial direction, and
the first heat shield plate has two ends arranged along the central rotation axis and connected to the rotor disks, while the second heat shield plate has two ends arranged along the central rotation axis at least any one of which is connected to the rotor disk, so that the first communication hole communicates with the space between the first heat shield plate and the second heat shield plate through at least one opening formed in the second heat shield plate, through a gap between the second heat shield plate and the rotor disk, or through this opening and this gap.

10. The axial-flow turbine of claim 9,
wherein each of the first heat shield plate and the second heat shield plate has at least one opening formed on its surface.

11. The axial-flow turbine of claim 9, further comprising:
at least one structure fixed in the space between the first heat shield plate and the second heat shield plate.

12. A power plant, comprising:
an oxygen producing device configured to extract only oxygen by removing nitrogen contained in air;
a combustor configured to receive the oxygen extracted by the oxygen producing device, fuel, and $CO_2$, to generate combustion gas;
the axial-flow turbine of claim 1 configured to receive the combustion gas, to be driven and rotated;
a power generator configured to receive rotational driving force from the axial-flow turbine, to generate power;
a regenerative heat exchanger configured to receive exhaust from the axial-flow turbine and $CO_2$, to supply the combustor with $CO_2$ thermally exchanged with this exhaust;
a cooler configured to cool the exhaust on which thermal exchange has been performed by the regenerative heat exchanger;
a moisture separator configured to emit $CO_2$ by separating and removing moisture from the exhaust cooled by the cooler; and
a compression pump configured to pressurize $CO_2$ emitted from the moisture separator, to supply it to the regenerative heat exchanger.

* * * * *